May 3, 1932.  J. J. ADDUCI  1,856,614
DIRECTION INDICATING APPARATUS FOR MOTOR VEHICLES
Filed March 26, 1930
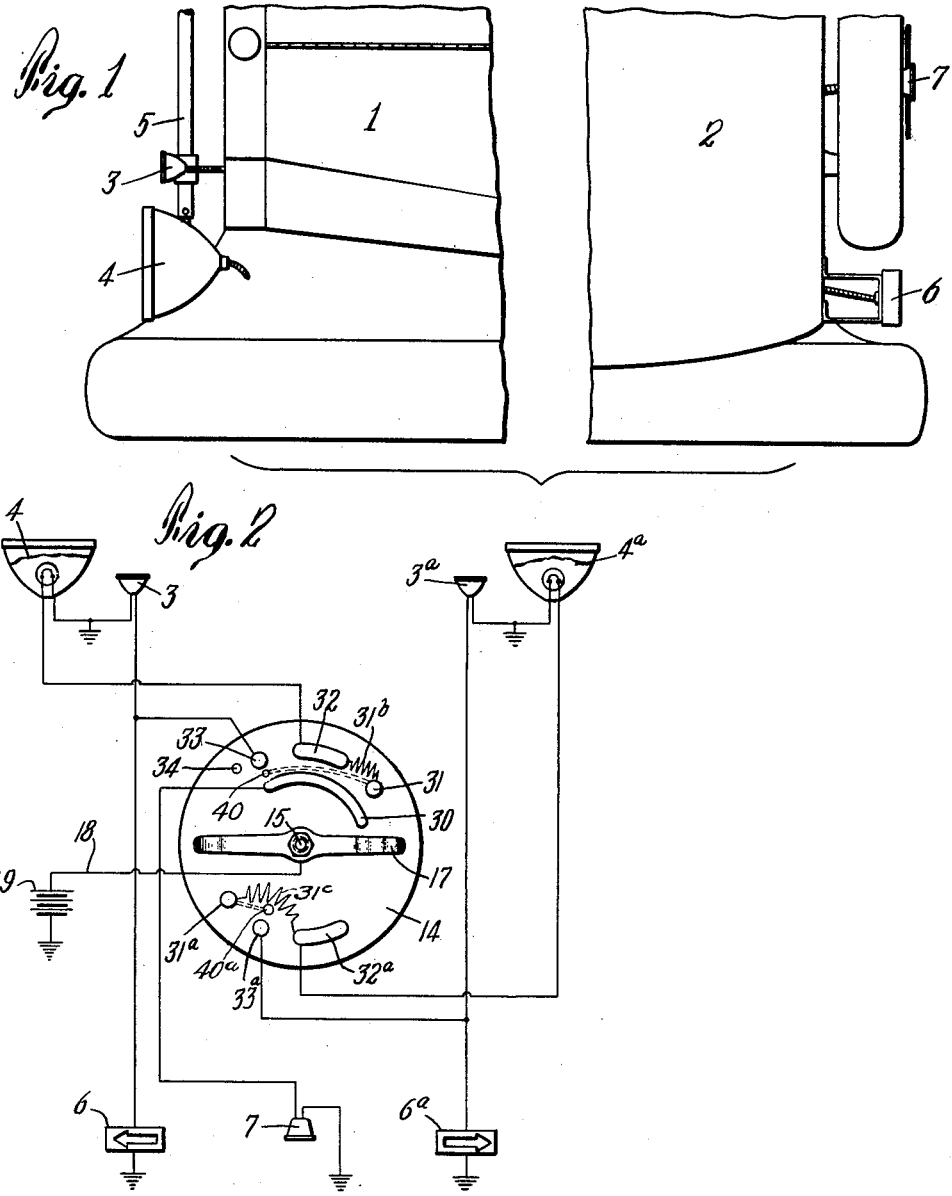
Inventor:
Joseph J. Adduci.
by Wright Brown Quinby Macy
Att'ys.

Patented May 3, 1932

1,856,614

UNITED STATES PATENT OFFICE

JOSEPH JAMES ADDUCI, OF BOSTON, MASSACHUSETTS

DIRECTION INDICATING APPARATUS FOR MOTOR VEHICLES

Application filed March 26, 1930. Serial No. 439,023.

This invention relates to electrically illuminated direction signaling lamps of a motor vehicle adapted to show the direction of turn anticipated by the operator.

The object of the invention is to provide an improved apparatus including means for accurately controlling such signal lamps.

Of the accompanying drawings forming a part of this specification,—

Figure 1 is a fragmentary top plan view, showing portions of the left front and left rear ends of an automobile, and elements of my improved apparatus attached thereto.

Figure 2 is a diagrammatic view, showing the apparatus inoperatively conditioned.

The same reference characters indicate the same parts in all of the figures.

In Figure 1 of the drawings, 1 designates the left front of an automobile, and 2 designates the left rear.

3 designates a turn-announcing front signal lamp at the left side, used to warn those in front when a left turn is to be made. There is a similar front signal lamp 3a (Figure 2) at the right side, to warn those in front that a right turn is to be made.

The signal lamps 3 and 3a are mounted adjacent the usual head lamps 4 and 4a, as indicated in Figures 1 and 2, and may be mounted on the usual head-lamp tie-rod 5 (Figure 1).

To signal those in the rear there are attached to the rear of the automobile in positions corresponding to those of the lamps 3 and 3a, turn-announcing rear signal lamps 6 and 6a, used to indicate respectively a left turn or a right turn.

The casings of the lamps 6 and 6a are preferably oblong in shape, and have longitudinally disposed light-emitting openings, preferably arrow shaped, through which light from a source from within the casings is projected rearwardly, said openings pointing to left and right respectively.

The signal lamps 3, 3a, 6 and 6a, are illuminated by electric bulbs connected to the storage battery of the automobile and controlled through a switch, which includes a base 14 of insulating material, and is shown by Figure 2.

The switch may be made with an insulating base 14.

There extends through the center of the switch base, a shaft 15 by which the switch is operated. To the end of the shaft 15 is fixed an elongated contact wiper blade 17 and one end of a flexible conductor 18 extending to the battery 19 (Figure 2).

The insulated base 14 has a series of contact members, to which electric current may be conveyed by means of the wiper blade 17, thus lighting such lamps as may be desired.

Said members include an arcuate contact member 30, connected by a conductor to the rear or tail lamp 7 and so arranged as to be in contact with the wiper blade 17 continuously, when said blade is moved to either of its "on" positions, so that when the apparatus is conditioned for operation, the tail lamp will be operative without interruption, regardless of the operativeness of the turn-announcing lamps 3, 3a, and 6, 6a.

The contact members of the switch include also dimmer contact members 31 and 31a, which are connected by conductors with resistance coils 31b and 31c, through which medium the electric current flowing to the head lamps is reduced, thus giving a dimmed effect.

Other contact members 32 and 32a are connected by conductors respectively to the left and right head lamp, and furnish bright lights for driving.

Another contact member 33 is connected by conductors to the left-front and left-rear signal lamps. The member 33a is connected to the right-front and right-rear signal lamps.

A contact member 40 is located on the base 14 on the same radius as the contact member 33 so that when the blade 17 is on the contact 33 it is also on the contact 40. The contact 40 is connected with the contact 31. In like manner, a contact member 40a is located on the same radius with the contact member 33a and is connected to the contact member 31a. As a result of this structure, when the wiper blade is swung to light the left hand signal lamp 3, it also dims the head light 4a.

When the wiper blade is swung to light the signal lamp 3a, it dims the head light 4.

At 34 is shown a stop pin, for the purpose of limiting the throw of the wiper blade 17.

The herein described apparatus is especially well adapted to night driving, when hand signals are of little or no value, but it is conceivable that with proper candle-power bulbs and reflectors and colored lenses, the apparatus will function equally well in daytime.

For ordinary night driving, the wiper blade 17 will remain in an "on" position, causing the two headlights and the tail light to operate.

It will be apparent that the apparatus will function equally well in daylight, because the temporary lighting of the head lamp (opposite the front signal lamp to be illuminated) while not necessary, will not impair the efficiency of the apparatus.

While the construction and arrangement of this direction-indicating apparatus and especially the dimming feature is sketched in a most easily understood form, obviously modifications and changes may be made without departing from the spirit of the invention or the scope of the claim.

The sketch as shown illustrates only one way of carrying out the invention; other constructions may be devised to effect the same results.

I claim:

In a motor vehicle having the usual left and right head lamps, a direction-signaling apparatus comprising front left and right announcing lamps, rear left and right announcing lamps, and means controlling said lamps comprising a switch having a plurality of contact members connected respectively with said head lamps and said announcing lamps, a manually operable wiper blade movable to different "on" positions and to an "off" position relative to the contact members for said announcing lamps, the arrangement being such that the left front and rear announcing lamps and the right head lamp are lighted and the left head lamp is dimmed when the wiper blade is in one "on" position, and the right front and rear announcing lamps and the left head lamp are lighted and the right head lamp is dimmed when the wiper blade is in another "on" position.

In testimony whereof I have affixed my signature.

JOSEPH JAMES ADDUCI.